UNITED STATES PATENT OFFICE.

THOMAS A. EDISON, OF LLEWELLYN PARK, NEW JERSEY, ASSIGNOR TO EDISON STORAGE BATTERY COMPANY, A CORPORATION OF NEW JERSEY.

REVERSIBLE GALVANIC BATTERY.

SPECIFICATION forming part of Letters Patent No. 700,136, dated May 13, 1902.

Application filed March 5, 1901. Renewed March 3, 1902. Serial No. 96,408. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Reversible Galvanic Batteries, (Case No. 1,053,) of which the following is a description.

My invention relates to improvements in reversible galvanic or so-called "storage" batteries.

In Letters Patent of the United States granted July 16, 1901, and numbered 678,742, I describe a new reversible battery wherein one of the elements is finely-divided iron, which in the operation of the battery is successively oxidized and reduced. In my said patent I describe as the preferable process for producing finely-powdered iron suitable for oxidation electrically in an alkaline solution the electrolytic oxidation of iron monosulfid in a solution of potassic hydroxid and the subsequent reduction of the oxid so obtained to the metallic state, and I refer therein to the difficulties which were encountered experimentally in my attempts to utilize iron as the oxidizable element of a reversible galvanic cell employing an alkaline electrolyte.

My present invention consists in the use of scale oxid of iron for electrolytic reduction and oxidation in the battery, as I find that scale oxid is capable of effective use and can be produced much more economically than oxid of iron obtained by subjecting the monosulfid to electrolytic oxidation, as described in said patent.

In carrying my invention into effect I subject sheets of pure Norway iron to a rather high temperature in a muffle in the presence of air, whereby a thin scale will immediately form after the sheet has reached a red heat. This scale is then immediately detached by withdrawing the plates and by bending or striking them so as to dislodge the oxid, after which the plates can be returned again to the muffle for further oxidation, which operations are repeated, the scale being successively formed and removed as long as the plates can be practically handled. The scale thus formed is preferable to the scale which would be formed by leaving the iron sheets in the muffle for a long time, since in the latter case a larger proportion of the scale will be raised to a higher or ferric state of oxidation, which oxid is not reducible by the current; but by permitting the sheets to remain in the muffle only until they reach a red heat and by then immediately detaching the scale oxid the latter will be largely of a low condition of oxidation and be capable of electrical reduction, and hence will be suitable for effective use in a reversible galvanic cell. When a sufficient quantity of the scale has been thus made, it is reduced to a fine powder—such, for example, as may be passed through a screen of forty thousand meshes per square inch—and is then mixed with flake-graphite in the same way as I describe the mixing of the monosulfid of iron with flake-graphite in my said patent. Preferable proportions are eight parts, by weight, of the scale oxid and two parts, by weight, of flake-graphite. The mass of scale oxid and flake-graphite is then packed under pressure in suitable perforated supporting receptacles or plates, made, preferably, of nickel or nickel-plated iron or other metal, and is subjected for a long time in an alkaline solution to the reducing action of the current until the oxid is converted to the metallic form, whereupon the electrode will be ready for use.

By employing flake-graphite its foliated or micaceous form acts to bind the entire mass intimately together, so that gasing due to overcharging will not result in disintegration thereof, particularly when the perforations in the supporting-receptacles are smaller than the graphite particles.

I find that the preliminary reduction of the scale oxid is facilitated in proportion to the fineness of the grinding thereof, so that, as stated, for reasons of economy in manufacture the oxid is reduced to a very fine powder before being mixed with the graphite.

The advantage of employing scale oxid obtained as described as compared with oxid made by electrolytically reducing the monosulfid of iron is that the process of eliminating the sulfur necessary in the latter case is obviated, while the porous mass obtained does not swell in the least when immersed in the electrolyte and in consequence does not subject the supporting-receptacles to any stress.

The electrodes employing finely-divided iron obtained as described and flake-graphite are used in an alkaline electrolyte, preferably a twenty-five-per-cent. solution of potassic hydroxid in water, with any suitable depolarizer. For the latter element I preferably make use of a mixture of finely-divided oxid of nickel or cobalt, preferably the former, mixed with flake-graphite sustained in nickel or nickel-plated perforated receptacles, as I describe in said application; but obviously other forms of depolarizers may be employed—as, for example, finely-divided copper, as I describe in my application for Letters Patent filed October 31, 1900, Serial No. 34,994.

Having now described my invention, what I claim as new, and desire to secure by Letters Patent, is as follows:

1. An element for a reversible galvanic cell, consisting of electrolytically-reducible scale oxid of iron, substantially as set forth.

2. An element for a reversible galvanic cell, consisting of electrolytically-reducible scale oxid of iron in finely-divided form, substantially as set forth.

3. A reversible galvanic cell, comprising an alkaline electrolyte, an element consisting of scale oxid of iron, and a second element having a depolarizing material not soluble in such solution, substantially as set forth.

4. A reversible galvanic cell, comprising an alkaline electrolyte, an element consisting of scale oxid of iron in finely-divided form, and a second element having a depolarizing material not soluble in such solution, substantially as set forth.

5. An element for a reversible galvanic cell, consisting of scale oxid of iron and graphite mixed therewith, substantially as set forth.

6. An element for a reversible galvanic cell, consisting of scale oxid of iron and micaceous, foliated or flake-graphite mixed therewith, substantially as set forth.

7. An element for a reversible galvanic cell, consisting of scale oxid of iron in finely-divided form and graphite mixed therewith, substantially as set forth.

8. A reversible galvanic cell, comprising an alkaline electrolyte, an element consisting of scale oxid of iron and graphite mixed therewith, and a second element having a depolarizing material not soluble in such solution, substantially as set forth.

9. A reversible galvanic cell, comprising an alkaline electrolyte, an element consisting of scale oxid of iron, and a second element having a depolarizing element consisting of an oxid of a magnetic metal other than iron, substantially as set forth.

10. A reversible galvanic cell, comprising an alkaline electrolyte, an element consisting of scale oxid of iron, and a second element having a depolarizing material consisting of oxid of nickel, substantially as set forth.

11. A reversible galvanic cell, comprising an alkaline electrolyte, an element consisting of finely-divided scale oxid of iron mixed with graphite, and a second element having a depolarizing element consisting of oxid of nickel mixed with flake-graphite, substantially as set forth.

This specification signed and witnessed this 18th day of February, 1901.

THOS. A. EDISON.

Witnesses:
FRANK L. DYER,
JNO. R. TAYLOR.